United States Patent
Shimizu et al.

(10) Patent No.: US 9,752,017 B2
(45) Date of Patent: Sep. 5, 2017

(54) AIR PERMEATION RESISTANT FILM AND PNEUMATIC TIRE

(75) Inventors: Toshiki Shimizu, Osaka (JP); Shigenori Inata, Osaka (JP); Tomohiko Kurahashi, Osaka (JP); Junzo Matsuno, Osaka (JP); Tatsuya Endo, Osaka (JP); Shigeo Ukyo, Shiga (JP); Momoko Daitoku, Shiga (JP)

(73) Assignees: TOYO TIRE & RUBBER CO., LTD., Osaka-shi, Osaka (JP); TOYOBO CO., LTD., Osaka-shi, Osaka (JP)

( * ) Notice: Subject to any disclaimer, the term of this patent is extended or adjusted under 35 U.S.C. 154(b) by 497 days.

(21) Appl. No.: 14/346,142

(22) PCT Filed: Sep. 21, 2011

(86) PCT No.: PCT/JP2011/005320
§ 371 (c)(1),
(2), (4) Date: Apr. 11, 2014

(87) PCT Pub. No.: WO2013/042167
PCT Pub. Date: Mar. 28, 2013

(65) Prior Publication Data
US 2014/0238570 A1    Aug. 28, 2014

(51) Int. Cl.
*B60C 1/00* (2006.01)
*B60C 5/14* (2006.01)
(Continued)

(52) U.S. Cl.
CPC .......... *C08L 15/00* (2013.01); *B29D 30/0681* (2013.01); *B60C 1/0008* (2013.01);
(Continued)

(58) Field of Classification Search
CPC ............ B60C 1/0008; B60C 5/00; B60C 5/14
See application file for complete search history.

(56) References Cited

U.S. PATENT DOCUMENTS 4,893,947 A * 1/1990 Hurley .................. F16C 13/006
384/549
5,714,573 A * 2/1998 Randall ................... C08L 67/04
264/239
(Continued)

FOREIGN PATENT DOCUMENTS

JP    8-258505 A    10/1996
JP    8-259741 A    10/1996
(Continued)

OTHER PUBLICATIONS

Machine translation of JP 2009-263456, 2009.*
(Continued)

*Primary Examiner* — Justin Fischer
(74) *Attorney, Agent, or Firm* — Westerman, Hattori, Daniels & Adrian, LLP

(57) ABSTRACT

Provided is an air permeation resistant film in which flexibility can be imparted to the film without remarkably increasing the proportion of a rubber constituting a dispersed phase. An air permeation resistant film comprising (A) a thermoplastic polyester elastomer which comprises a block copolymer containing a polyester as a hard segment and has a melting point of from 180 to 230° C., and (B) a rubber, in a mass ratio (A)/(B) of from 90/10 to 40/60, wherein the component (A) and the component (B) are melt-kneaded to perform dynamic crosslink, thereby forming a continuous phase composed of the component (A) and a dispersed phase composed of the component (B), and the film has an air permeation coefficient at 80° C. of $5\times10^{13}$ fm$^2$/Pa·s or less and Young's modulus of 120 MPa or less.

22 Claims, 1 Drawing Sheet

(51) Int. Cl.
  *C08L 15/00* (2006.01)
  *C08J 5/18* (2006.01)
  *B29D 30/06* (2006.01)
  *C08L 67/02* (2006.01)
  *C08L 67/00* (2006.01)
  *C08L 21/00* (2006.01)
  *C08L 69/00* (2006.01)
  *C08L 23/08* (2006.01)

(52) U.S. Cl.
  CPC ............... *B60C 5/14* (2013.01); *C08J 5/18* (2013.01); *C08L 21/00* (2013.01); *C08L 23/0884* (2013.01); *C08L 67/00* (2013.01); *C08L 67/02* (2013.01); *C08L 67/025* (2013.01); *C08L 69/005* (2013.01); *B29D 2030/0682* (2013.01); *C08J 2321/00* (2013.01); *C08J 2367/02* (2013.01)

(56) References Cited

U.S. PATENT DOCUMENTS

| | | | |
|---|---|---|---|
| 5,738,158 | A | 4/1998 | Ozawa et al. |
| 5,919,864 | A * | 7/1999 | Watanabe ............... C08L 21/00 525/165 |
| 5,938,869 | A | 8/1999 | Kaido et al. |
| 6,079,465 | A | 6/2000 | Takeyama et al. |
| 6,359,071 | B1 | 3/2002 | Watanabe et al. |
| 7,488,521 | B2 * | 2/2009 | Morohoshi ............... B32B 1/08 138/137 |
| 8,030,417 | B2 * | 10/2011 | Maruyama ............. C08G 63/64 525/437 |
| 2009/0038728 | A1 * | 2/2009 | Kanenari ................ B32B 25/14 152/510 |

FOREIGN PATENT DOCUMENTS

| | | | |
|---|---|---|---|
| JP | 10-35232 | A | 2/1998 |
| JP | 11-292990 | A | 10/1999 |
| JP | 2000-63572 | A | 2/2000 |
| JP | 2003-26931 | A | 1/2003 |
| JP | 2006-224854 | A | 8/2006 |
| JP | 2008-309304 | A | 12/2008 |
| JP | 2009-263456 | * | 12/2009 |
| JP | 2010-260280 | A | 11/2010 |

OTHER PUBLICATIONS

International Search Report of PCT/JP2011/005320, mailing date of Nov. 8, 2011.

Japanese Office Action dated Mar. 27, 2012, issued in Japanese Patent Application No. 2010-085423, w/English translation, (6 pages).

German Office Action dated Jan. 8, 2016, issued in counterpart German Patent Application No. 11 2011 105 557.9 with English translation. (8 pages).

* cited by examiner

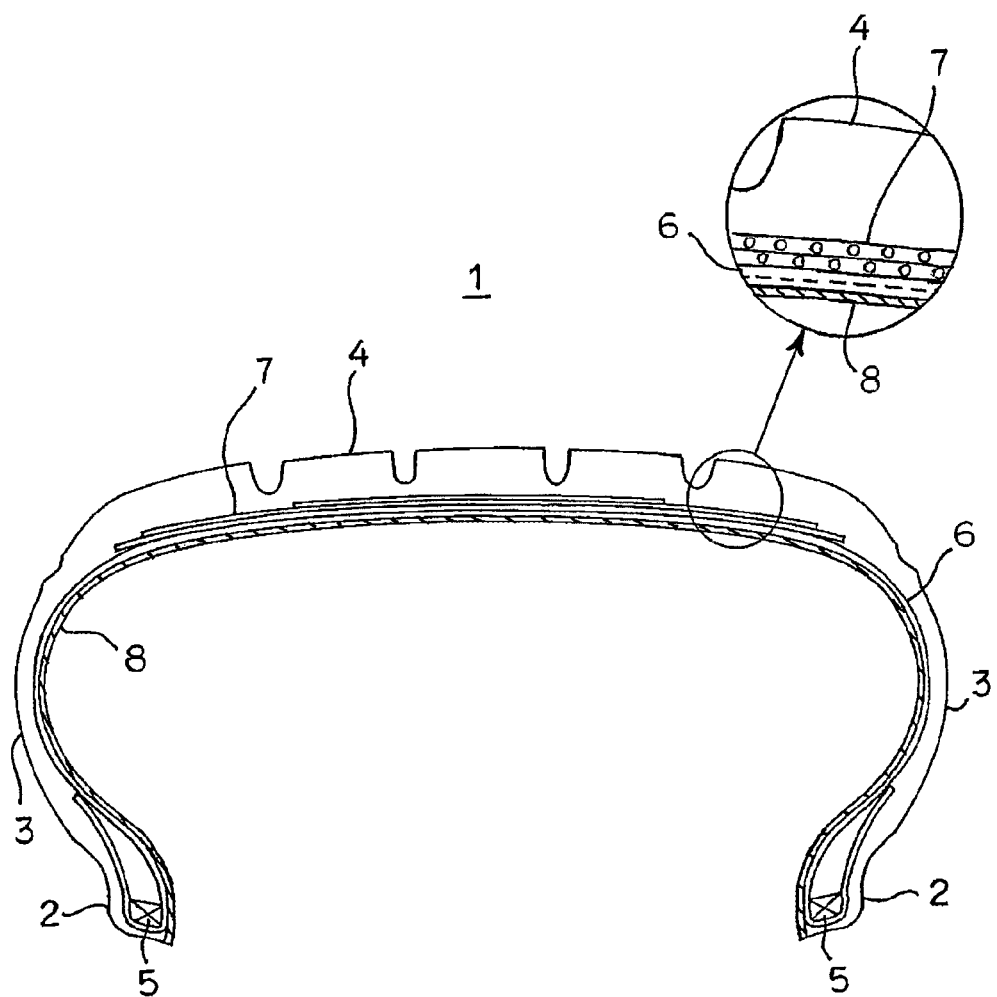

AIR PERMEATION RESISTANT FILM AND PNEUMATIC TIRE

TECHNICAL FIELD

The present invention relates a film having excellent resistance to air permeation, and a pneumatic tire using the film as an inner liner or other internal pressure holding layer. The invention further relates to a process for producing those.

BACKGROUND ART

An inner liner is provided on an inside surface of a pneumatic tire as an air permeation inhibiting layer in order to hold air pressure of a tire constant. The inner liner is generally constituted of a rubber layer through which a gas is difficult to permeate, such as butyl rubber or halogenated butyl rubber. To thin the inner liner for the purpose of weight reduction of a tire, it is proposed that an air permeation resistant film having an islands-sea structure in which a continuous phase is formed of an air permeation resistant thermoplastic resin and a dispersed phase is formed of an elastomer component is used as an inner liner.

For example, PTL 1 mentioned below discloses that by melt-kneading a thermoplastic resin having an air permeation coefficient of $25 \times 10^{-12}$ cc·cm/cm²·sec·cmHg or less and Young's modulus of more than 500 MPa and an elastomer having an air permeation coefficient of more than $25 \times 10^{-12}$ cc·cm/cm²·sec·cmHg and Young's modulus of 500 MPa or less to perform dynamic crosslink, a continuous layer is formed of the thermoplastic resin and a dispersed phase is formed of the elastomer, thereby a film having an air permeation coefficient of $25 \times 10^{-12}$ cc·cm/cm²·sec·cmHg or less and Young's modulus of from 1 to 500 MPa is obtained.

However, in the technology disclosed in PTL 1, because a thermoplastic resin having high rigidity constitutes a continuous phase (matrix), if it is tried to enhance flexibility of a film in order to improve moldability of a tire (that is, for example when it is tried to obtain a film having low Young's modulus such as 100 MPa or less), the proportion of an elastomer constituting the dispersed phase must be increased. However, where the proportion of the elastomer is increased, phase transition is easy to occur between the thermoplastic resin and the elastomer, and it becomes difficult to prepare a thin film having a thickness of, for example, 0.2 mm or less. As a result, excellent air permeation resistance due to the continuous phase formed of the thermoplastic resin becomes difficult to be developed.

PTL 2 mentioned below discloses a method for decreasing a particle size of an elastomer component which constitutes a dispersed phase (domain) using a material having high proportion of an elastomer, as one technique for enhancing flexibility. That is, PTL 2 discloses that by kneading and vulcanizing compounding ingredients under the conditions that a melt viscosity ratio of the compounding ingredients and volume fraction×melt viscosity ratio are constant in each kneading step using a two-stage kneading treatment, the dispersed phase can be formed of the elastomer component even in the range of the proportion of the elastomer exceeds 50 wt %, and its particle size can be decreased.

PTL 3 mentioned below discloses that for the same purpose as PTL 2, by a rubber composition comprising a rubber single substance as an elastomer component, and at least one compounding ingredient of a reinforcing agent, a plasticizer, an oil and a crosslinking agent, added thereto, and by using two components having the same composition and structure and having different viscosity, as thermoplastic resins, the relationship between those melt viscosities and volume fractions are specified into predetermined ranges.

Even in PTL 2 and PTL 3, a material constituting a continuous phase is a thermoplastic resin having high rigidity, similar to PTL 1, and PTL 1, PTL 2 and PTL 3 do not fundamentally solve the above-described problems.

CITATION LIST

Patent Literature

PTL 1: JP-A-08-259741
PTL 2: JP-A-2000-63572
PTL 3: JP-A-2003-26931

SUMMARY OF INVENTION

Technical Problem

The present invention has been made in view of the above points, and has an object to provide an air permeation resistant film in which flexibility can be imparted to the film without remarkably increasing the proportion of a rubber constituting a dispersed phase, thereby tire moldability when using the film as a inner liner is good while maintaining film formability good, and an internal pressure holding effect of a tire can be developed by the air permeation resistance.

Solution to Problem

The present inventors have found that when a more flexible thermoplastic elastomer is used as a component constituting a continuous phase in place of the conventional thermoplastic resin having high rigidity and a rubber as a component constituting a dispersed phase is combined with the thermoplastic elastomer, flexibility can be imparted without increasing the proportion of a rubber, and have reached to complete the present invention based on this finding.

That is, the air permeation resistant film according to the present invention is a film comprising (A) a thermoplastic polyester elastomer which comprises a block copolymer containing a polyester as a hard segment and has a melting point of from 180 to 230° C., and (B) a rubber, in a mass ratio (A)/(B) of from 90/10 to 40/60, wherein the component (A) and the component (B) are melt-kneaded to perform dynamic crosslink, thereby forming a continuous phase composed of the component (A) and a dispersed phase composed of the component (B). The air permeation resistant film has an air permeation coefficient at 80° C. of $5 \times 10^{13}$ fm²/Pa·s or less and Young's modulus of 120 MPa or less.

A pneumatic tire according to the present invention has the air permeation resistant film as an inner liner or other air permeation inhibiting layer.

A method for producing an air permeation resistant film according to the present invention comprises melt-kneading (A) a thermoplastic polyester elastomer which comprises a block copolymer containing a polyester as a hard segment and has a melting point of from 180 to 230° C., and (B) a rubber, in a mass ratio (A)/(B) of from 90/10 to 40/60 to perform dynamic crosslink, thereby obtaining a polymer composition comprising a continuous phase composed of the component (A) and a dispersed phase composed of the component (B), and forming a film comprising the polymer composition.

A method for producing a pneumatic tire according to the present invention comprises obtaining an air permeation resistant film by the production method described above, preparing a cylindrical inner liner comprising the air permeation resistant film, fixing carcass ply and other rubber members including a tread rubber to an outer peripheral side of the inner liner to prepare a green tire, and vulcanization molding the green tire in a mold.

Advantageous Effects of Invention

According to the present invention, flexibility can be imparted to a film without remarkably increasing the proportion of a rubber constituting a dispersed phase. As a result, when such a film is used as an air permeation inhibiting layer such as an inner liner, tire moldability can be improved while maintaining film formability good. Furthermore, excellent resistance to air permeation can be imparted to a film by an air permeation resistance of a thermoplastic polyester elastomer constituting a continuous layer, as compared with a rubber simple substance. Therefore, when such a film is used as an air permeation inhibiting layer of a tire, an internal pressure holding effect of a tire can be developed while attempting to reduce a weight of a tire by thinning a film.

BRIEF DESCRIPTION OF DRAWINGS

FIG. 1 is a cross-sectional view of a pneumatic tire according to the embodiment.

DESCRIPTION OF EMBODIMENTS

Items relating to the embodiment of the present invention are described in detail below.

The air permeation resistant film according to the embodiment comprises (A) a thermoplastic polyester elastomer comprising a block copolymer containing a polyester as a hard segment, and (B) a rubber, in amass ratio (A)/(B) of from 90/10 to 40/60, and is characterized by having an islands-sea structure comprising a continuous phase (matrix phase) composed of the component (A) and a dispersed phase (domain phase) composed of the component (B). The thermoplastic elastomer is a block copolymer comprising a hard segment forming a thermoplastic frozen phase or crystal phase, and a soft segment showing rubber elasticity, and has rubber elasticity at ordinary temperatures due to the formation of the soft segment, and low Young's modulus, as compared with thermoplastic resins such as nylon and polyester. In the prior art, the thermoplastic elastomer is situated as one example of an elastomer component constituting a dispersed phase. However, the present embodiment is characterized in that such a thermoplastic elastomer is compounded as a material constituting a continuous phase. In detail, in the film described in PTL 1 above, a thermoplastic resin forms the continuous phase (sea) and an elastomer component forms the dispersed phase (island), whereas in the present embodiment, a thermoplastic elastomer forms the continuous phase (sea) and a rubber forms the dispersed phase (island). Therefore, in PTL 1, the continuous phase is the thermoplastic resin, whereas in the present embodiment, the continuous phase is the thermoplastic elastomer, and thus PTL 1 and the present embodiment apparently differs in this point. Furthermore, in PTL 1, the thermoplastic elastomer is described as one example of elastomer components forming the dispersed phase, and the characteristic of the present embodiment that the thermoplastic elastomer is used in the continuous phase is not suggest. According to the present embodiment, because the continuous layer is composed of the thermoplastic elastomer, not the thermoplastic resin, a more flexible film can be prepared without remarkably increasing the proportion of a rubber constituting the dispersed phase. Furthermore, according to the present embodiment, by using the thermoplastic elastomer having air permeation resistance superior to that of a rubber in the continuous phase, weight reduction by thinning a film can be attempted as compared with an inner liner of rubber simple substance.

In the present embodiment, a thermoplastic polyester elastomer having a melting point of from 180 to 230° C. is used as the component (A) constituting the continuous phase. Kinds of the thermoplastic elastomer (TPE) include a polyester elastomer having a hard segment composed of a polyester, a polyamide elastomer having a hard segment composed of a polyamide, a polystyrene elastomer having a hard segment composed of a polystyrene, a polyolefin elastomer having a hard segment composed of a polyethylene or a polypropylene, and a polyurethane elastomer having an urethane structure in a hard segment. Assuming uses of a tire, the component (A) must withstand heating during vulcanization molding, and from this standpoint, of those elastomers, a polyester elastomer (TPEE) having high melting point and high heat resistance as compared with those of other thermoplastic elastomers is preferably used.

That is, by using the thermoplastic polyester elastomer having a melting point of from 180° C. or higher, in vulcanization molding a tire using the film as an inner liner, the possibility that the film undesirably deforms is reduced, and tire moldability can be secured. That is, a tire can be molded without adhering the film to a bladder even though under vulcanization conditions are nearly equivalent to those of a tire having an inner liner of the general-purpose rubber. Furthermore, where a melting point of the thermoplastic polyester elastomer is low, a vulcanization temperature of a tire must be set to low temperature, and in such a case, a vulcanization time is prolonged. However, when the melting point is high, the vulcanization temperature can be set to high temperature, and as a result, a vulcanization time can be shortened. The melting point of the thermoplastic polyester elastomer is preferably 190° C. or higher, and more preferably 200° C. or higher. The upper limit of the melting point is preferably 230° C. or lower, and more preferably 220° C. or lower. The melting point of 230° C. or lower avoids excessively high kneading temperature when preparing a dynamically crosslinked product and can suppress the deterioration of a rubber of the component (B). In the present invention, the melting point is a value measured according to a DSC (differential scanning calorimeter) method of JIS K7121.

In the thermoplastic polyester elastomer, a polyester of the hard segment is obtained by reacting dicarboxylic acid with diol.

An aromatic dicarboxylic acid is preferably used as the dicarboxylic acid, and an ordinary aromatic dicarboxylic acid is widely used as the aromatic dicarboxylic acid. Although not particularly limited, the main aromatic dicarboxylic acid is preferably terephthalic acid or naphthalenedicarboxylic acid. Examples of other acid component include aromatic dicarboxylic acids such as diphenyldicarboxylic acid, isophthalic acid and 5-sodium sulfoisophthalic acid; alicyclic dicarboxylic acids such as cyclohexanedicarboxylic acid and tetrahydrophthalic anhydride; and aliphatic dicarboxylic acids such as succinic acid, glutaric acid, adipic acid, azelaic acid, sebacic acid, dodecanedioic acid, dimer acid and hydrogenated dimer acid. Those other acid components are used within a range that does not greatly decrease a melting point of the polyester elastomer, and the amount thereof is preferably less than 30 mol %, and more preferably less than 20 mol %, based on the total acid components.

Aliphatic or alicyclic diol can be used as the diol. General aliphatic or alicylic diol is widely used as the aliphatic or alicyclic diol, and although not particularly limited, mainly alkylene glycols having from 2 to 8 carbon atoms are preferred. Specifically, examples of the diol include ethylene glycol, 1,3-propylene glycol, 1,4-butanediol, 1,6-hexanediol and 1,4-cyclohexanedimethanol. Of those, 1,4-butanedio and 1,4-cyclohexanedimethanol are most preferred.

The component constituting a polyester of the hard segment is preferably a component comprising a butylene terephthalate unit or a butylene naphthalate unit from the standpoints of properties, formability and cost performance. In the case of the naphthalate unit, 2,6-form is preferred.

The aromatic polyester constituting such a hard segment is not particularly limited, and, for example, an aromatic polyester having a general number average molecular weight of from 10,000 to 40,000 can be used.

In the thermoplastic polyester elastomer, examples of the constituent component of the soft segment include a polyester, a polyether and a polycarbonate. Of those, a polyester elastomer having a soft segment composed of a polycarbonate is preferably used. In the case that the soft segment is a polycarbonate, further excellent air permeation resistance can be imparted to the film as compared with the case of a polyester and a polyether, and the balance between air permeation resistance and flexibility is easily achieved. In detail, when air permeation resistance and flexibility (Young's modulus) were evaluated by changing the kind of a soft segment in the case of limiting the hard segment to polybutylene terephthalate, the air permeation coefficient tends to be lowered in the order of a polyether type, a polyester type and a polycarbonate type (that is, the polycarbonate type has the lowest air permeation coefficient), and the balance between air permeation resistance and Young's modulus was excellent.

Examples of the polyester as the constituent component of the soft segment include aliphatic polyesters produced from aliphatic dicarboxylic acid having from 2 to 12 carbon atoms and aliphatic glycol having from 2 to 10 carbon atoms, for example, polyethylene adipate, polytetramethylene adipate, polyethylene sebacate, polyneopentyl sebacate, polytetramethylene dodecanate, polytetramethylene azelate and polyhexamethylene azelate, and polylactones represented by poly-ε-caprolactone.

Examples of the polyether as the constituent component of the soft segment include polyalkylene ether glycol such as poly(ethylene oxide) glycol, poly(propylene oxide) glycol or poly(tetramethylene oxide) glycol, mixtures of those, and copolymerized polyether glycol obtained by copolymerizing their polyether glycol constituent components.

Examples of the polycarbonate as the constituent component of the soft segment include aliphatic polycarbonate diols produced from carbonate ester such as dimethyl carbonate or diethyl carbonate, and aliphatic glycol having from 2 to 12 carbon atoms.

A polyester elastomer having a hard segment composed of polybutylene terephthalate and a soft segment composed of aliphatic polycarbonate is particularly preferably used as the thermoplastic polyester elastomer. A polyester polycarbonate elastomer having excellent blocking property-holding property as described in Japanese Patent 4244067 is particularly preferred as such a polyester elastomer, and specific examples thereof include PELPRENE C-2000 manufactured by Toyobo Co., Ltd.

In the case that the soft segment is composed of aliphatic polycarbonate, the molecular weight of the aliphatic polycarbonate diol as a raw material is preferably from 3,000 to 80,000, and more preferably from 3,000 to 60,000, in terms of number average molecular weight (Mn). When the molecular weight of the aliphatic polycarbonate diol is 80,000 or less, compatibility between the hard segment and the soft segment becomes good, and mechanical property such as strength-elongation of the thermoplastic polyester elastomer obtained can be improved. Furthermore, when the molecular weight of the aliphatic polycarbonate diol is 3,000 or more, blocking property can be improved.

The molecular weight of the aliphatic polycarbonate diol can be obtained by dissolving an aliphatic polycarbonate diol sample in deuterated chloroform ($CDCl_3$), measuring H-NMR mentioned below to calculate terminal groups, and assigning the value into the following formula.

$$\text{Molecular weight}=1000000/((\text{amount of terminal groups (equivalent/ton)})/2)$$

[H-NMR Measurement]

Apparatus: Fourier transform nuclear magnetic resonance apparatus (AVANCE 500 manufactured by BRUKER)

Measurement solvent: Deuterated chloroform

Sample solution concentration: 3 to 5 vol %

$^1$H resonance frequency: 500.13 MHz

Flip angle of detection pulse: 45°

Data reading time: 4 seconds

Delay time: 1 second

Cumulated number: 50 to 200 times

Measurement temperature: Room temperature

In the thermoplastic polyester elastomer, a ratio between the hard segment and the soft segment is not particularly limited, but a mass ratio is preferably hard segment:soft segment=30:70 to 95:5, more preferably 40:60 to 90:10, and still more preferably 45:55 to 87:13. Particularly, in the case of the polycarbonate type thermoplastic polyester elastomer, by setting the ratio between the hard segment and the soft segment to the above ranges, air permeation resistance and Young's modulus are easy to be adjusted to preferable ranges.

The molecular weight of the thermoplastic polyester elastomer is not particularly limited, but the number average molecular weight (Mn) thereof is preferably from 20,000 to 100,000, and more preferably from 30,000 to 80,000. When the number average molecular weight is 20,000 or more, mechanical properties such as strength-elongation can be improved. Furthermore, when the number average molecular weight is 100,000 or less, a melt viscosity is lowered, thereby a processing temperature in melt-kneading the thermoplastic polyester elastomer with the rubber as the component (B) can be suppressed.

The number average molecular weight of the thermoplastic polyester elastomer can be measured as follows. A sample 4 mg was dissolved in 0.4 ml of chloroform/HFIP (hexafluoroisopropanol)=3/2 (v/v), followed by diluting with 7.6 ml of chloroform to prepare a sample solution (0.05%). The sample solution was filtered with a 0.2 μm membrane filter, and GPC analysis of the sample solution obtained was carried out under the following conditions.

Apparatus: TOSOH HLC-8320GPC

Column: TSKgel Super HM-H×2+TSKgel Super H2000 (TOSOH)

Solvent: Chloroform/HFIP=98/2 (v/v), flow rate: 0.6 ml/min
Concentration: 0.05%, injected amount: 20 µl
Temperature: 40° C.
Detector: UV (254 nm)

The molecular weight was calculated in standard polystyrene conversion.

It is preferred that the component (A) has an air permeation coefficient at 80° C. of $5 \times 10^{13}$ fm$^2$/Pa·s or less and Young's modulus of from 100 to 500 MPa. The component (A) may be constituted of one kind of the thermoplastic polyester elastomer and may be constituted of a blend of two kinds or more of the thermoplastic polyester elastomers. In the case of the former, it is sufficient if one kind of the thermoplastic polyester elastomer only satisfies the above conditions, and in the case of using two kinds or more as in the latter, it is sufficient if the blend only satisfies the above conditions. More preferably, even in the case of blending two kinds or more, all thermoplastic polyester elastomers are to satisfy the above conditions.

When the air permeation coefficient of the component (A) is $5 \times 10^{13}$ fm$^2$/Pa·s or less, excellent air permeation resistance can be imparted to the film. The air permeation coefficient is more preferably $3 \times 10^{13}$ fm$^2$/Pa·s or less. Excellent air permeation resistance can be imparted to the film as the value of the air permeation coefficient of the component (A) is low, and therefore the lower limit thereof is not particularly limited. However, the air permeation coefficient is practically $0.1 \times 10^{13}$ fm$^2$/Pa·s or more. The air permeation coefficient of the thermoplastic elastomer can be set by adjusting the kind of each of a hard segment and a soft segment, a ratio of those segments, and the like. For example, the air permeation coefficient can be decreased by increasing the proportion of the hard segment, and the air permeation coefficient can be decreased by selecting polymer species such that the structure of each segment becomes dense. In the present invention, the air permeation coefficient is a value measured by the conditions of test gas: air and test temperature: 80° C. according to JIS K7126-1 "Plastic-film and sheet-gas permeation rate test method, Part 1: differential pressure method". The reason that the measurement temperature is 80° C. is that in heavy load tires used in trucks, buses and the like, the temperature inside a tire is increased to 80° C. during running, and from this fact, evaluation is conducted under more severe test conditions.

Because Young's modulus of the component (A) is from 100 to 500 MPa, a polymer having low Young's modulus forms a continuous phase. Therefore, flexibility can be imparted to the film without increasing the proportion of a rubber as the component (B). In other words, where Young's modulus exceeds 500 MPa, the difference from the thermoplastic resin is decreased, and flexibility is lowered. Lower Young's modulus is preferred in the point of flexibility. However, Young's modulus and the air permeation coefficient generally have correlation, and the air permeation coefficient is increased as decreasing Young's modulus. Therefore, the component (A) having Young's modulus of 100 MPa or more is preferably used in the point of securing the air permeation coefficient. Young's modulus of the thermoplastic elastomer is preferably 400 MPa or less, and more preferably 300 MPa or less. From the standpoint of further decreasing the air permeation coefficient, a thermoplastic elastomer having Young's modulus of from more than 400 MPa to 500 MPa is preferably used in some cases. In more detail, the case is the embodiment using a thermoplastic elastomer having Young's modulus of from 420 to 480 MPa. In the present invention, Young's modulus is measured according to JIS K6251 "Tensile test method of vulcanized rubber" (JIS #3 dumbbell).

In the present embodiment, the rubber compounded as the component (B) constituting a dispersed phase (domain) is a rubber having Young's modulus of 50 MPa or less, and is compounded for the purpose of imparting flexibility that is not obtained by the thermoplastic elastomer alone of the component (A).

Various rubbers generally used after crosslinking (vulcanizing) are used as the rubber, and examples thereof include diene rubber and its hydrogenated rubber, such as natural rubber, epoxidized natural rubber, isoprene rubber, styrene butadiene rubber, butadiene rubber, nitrile rubber, hydrogenated nitrile rubber and hydrogenated styrene butadiene rubber; olefin rubber such as ethylene propylene rubber, maleic acid-modified ethylene propylene rubber, maleic acid-modified ethylene butylene rubber, butyl rubber and acryl rubber; halogen-containing rubber such as halogenated butyl rubber (for example, brominated butyl rubber or chlorinated butyl rubber), chloroprene rubber and chlorosulfonated polyethylene; silicone rubber, fluorine rubber and polysulfide rubber. Those may be used in any one kind alone or as mixtures of two kinds or more. Of those, at least one selected from butyl rubber (IIR), halogenated butyl rubber such as brominated butyl rubber (Br-IIR), nitrile rubber (NBR) and hydrogenated nitrile rubber (H-NBR) is preferably used from the standpoint of air permeation resistance.

Those rubbers have small Young's modulus as compared with the thermoplastic polyester elastomer of the component (A), and generally have Young's modulus of 50 MPa or less, in more detail, 30 MPa or less, and in still more detail, from 0.5 to 10 MPa, in a crosslinked state. For this reason, those rubbers can impart flexibility to the film even in a crosslinked state, as well as in the case that those rubbers are present in the film in an uncrosslinked state.

The rubber compounded as the component (B) may be any one kind or a blend of two kinds or more of the above-described rubber polymers. Various compounding ingredients generally compounded with a rubber composition, such as a filler, a softener, an age resister, a processing aid and a crosslinking agent, may be added to those rubbers. That is, the component (B) forming a dispersed phase may comprises a rubber composition in which various compounding ingredients were added to a rubber.

Compounding ratio between the thermoplastic elastomer of the component (A) and the rubber of the component (B) (a proportion as a polymer components excluding compounding ingredients such as a filler) is 90/10 to 40/60, and preferably 80/20 to 50/50, in mass ratio (A)/(B). That is, the component (A) is from 90 to 40 parts by mass, and the component (B) is from 10 to 60 parts by mass. Thus, by decreasing the compounding proportion of the rubber of the component (B) as possible, the possibility that a rubber converts into a continuous phase is decreased, thereby film formability can be improved. Furthermore, the rubber of component (B) has an air permeation coefficient as large as more than $5 \times 10^{13}$ fm$^2$/Pa·s. Therefore, the air permeation coefficient of the film can be decreased by decreasing the proportion of the rubber component.

The air permeation resistant film of the present embodiment may contain a compatibilizing agent, in addition to the above-described component (A) and component (B). The compatibilizing agent decreases interfacial tension between the thermoplastic elastomer of the component (A) and the rubber of the component (B), thereby compatibilizing those, and can decrease a particle size of the dispersed phase, thereby improving film formability.

Examples of the compatibilizing agent include polymer having one or both of the structures of the thermoplastic elastomer and the rubber, and polymers having functional groups capable of reacting or interacting with one or both of the thermoplastic elastomer and the rubber. Specifically, the compatibilizing agent is selected depending on the kinds of the thermoplastic elastomer and rubber used, and examples thereof include a graft copolymer in which a polycarbonate resin is a main chain and a modified acrylonitrile-styrene copolymer resin is a side chain, a copolymer having an ethylene main chain framework and a side chain containing an epoxy group (for example, an ethylene-glycidyl (meth) acrylate copolymer (that is, an epoxy group-containing ethylene copolymer such as an ethylene-glycidyl methacrylate copolymer and/or an ethylene-glycidyl acrylate copolymer)), and a graft copolymer in which ethylene-glycidyl (meth)acrylate is a main chain and a polystyrene resin is a side chain. Of those, a copolymer having an ethylene main chain framework and a side chain containing an epoxy group has the excellent effect of decreasing a particle size of a dispersed phase, and is preferred. The amount of the compatibilizing agent compounded is not particularly limited, but the amount can be from 0.5 to 10 parts by mass per 100 parts by mass of the total amount of the thermoplastic elastomer and the rubber.

Other than the above, various additives may be compounded within the ranges that do not impair the advantage of the present invention.

A method for producing an air permeation resistant film comprises melt-kneading the thermoplastic polyester elastomer of the component (A) and the rubber of the component (B) to obtain a polymer composition comprising the thermoplastic polyester elastomer forming a continuous phase and the rubber dispersed therein, and forming the polymer composition obtained into a film using an extruder or the like.

In this case, it is preferred that a crosslinking agent is added and the rubber of the component (B) is then dynamically crosslinked. By dynamically crosslinking, a particle size of a dispersed phase can be decreased, thereby improving flexibility. In the case of not dynamically crosslinking, there is a concern that fine dispersed phase once formed bonds to the neighboring dispersed phase by heating and the particle size is increased. However, such a disadvantage can be eliminated by dynamically crosslinking.

Examples of the crosslinking agent for dynamically crosslinking the rubber include a vulcanizing agent such as sulfur or a sulfur-containing compound, a vulcanization accelerator and a phenolic resin. The phenolic resin is preferably used in the point of heat resistance. The phenolic resin includes a resin obtained by condensation reaction between phenols and formaldehyde. More preferably, an alkyl phenol-formaldehyde resin is used. The amount of the crosslinking agent compounded is not particularly limited so long as the rubber of the component (B) can be properly crosslinked, but the amount is preferably from 0.1 to 10 parts by mass per 100 parts by mass of the rubber component (the amount as a polymer excluding a compounding ingredient such as a filler).

Various compounding ingredients to the thermoplastic elastomer or the rubber may be added during kneading, but are preferably previously mixed before kneading. A kneading machine used for kneading is not particularly limited, and examples of the kneading machine used include a twin-screw extruder, a screw extruder, a kneader and Banbury mixer.

In more detail, for example, a compounding ingredient such as a crosslinking agent is added to the rubber of the component (B) in a twin-screw extruder, followed by kneading, thereby preparing pellets of a rubber masterbatch, and the pellets are introduced in a twin-screw extruder together with the thermoplastic elastomer of the component (A), followed by melt-kneading to perform dynamic crosslink. Thus, pellets comprising a polymer composition in which the component (A) is a continuous phase and the component (B) is a dispersed phase are obtained. Alternatively, the thermoplastic elastomer of the component (A), the rubber of the component (B) and a compounding ingredient such as a crosslinking agent are introduced in a twin-screw extruder, those are melt-kneaded to perform dynamic crosslink, thereby pellets comprising the same polymer composition are obtained.

A method for forming a film comprising the polymer composition thus obtained can use a general method for forming a thermoplastic resin or a thermoplastic elastomer into a film, such as extrusion molding or calender molding. For example, an air permeation resistant film is obtained by extrusion molding the pellets obtained above using a twin-screw extruder or a single-screw extruder.

The air permeation resistant film according to the present embodiment has an air permeation coefficient at 80° C. of $5 \times 10^{13}$ fm$^2$/Pa·s or less. The air permeation coefficient of the film is larger than the value, superiority to the conventional general inner liner composed of a rubber composition alone of halogenated butyl rubber becomes small, and it becomes difficult to achieve weight reduction. The air permeation coefficient is more preferably $4 \times 10^{13}$ fm$^2$/Pa·s or less. The lower limit of the air permeation coefficient is not particularly limited, but is practically $0.5 \times 10^{13}$ fm$^2$/Pa·s or more. The air permeation coefficient of the film generally tends to be decreased as the proportion of the thermoplastic elastomer is increased or the air permeation coefficient of the thermoplastic elastomer and the air permeation coefficient of the rubber are decreased. The air permeation coefficient of the film can be set within the above range by appropriately setting those.

The air-impermeable film of the present invention has Young's modulus of 120 MPa or less. By this, follow-up property is increased, and processability when molding a tire becomes good. The Young's modulus is preferably 110 MPa or less, and still more preferably 100 MPa or less. The lower limit of the Young's modulus is not particularly limited, but the lower limit is practically 5 MPa or more, and more preferably 10 MPa or more. The Young's modulus of the film generally tends to be decreased as the proportion of the thermoplastic elastomer becomes smaller or Young's modulus of the thermoplastic elastomer becomes smaller, and additionally the Young's modulus of the film tends to be decreased as a particle size of the rubber that is a dispersed phase becomes smaller. The Young's modulus can be set within the above range by appropriately setting those.

The thickness of the air permeation resistant film is not particularly limited. For example, the thickness can be from 0.02 to 1.0 mm. The thickness is more preferably from 0.05 to 0.5 mm, and still more preferably 0.3 mm or less.

The air permeation resistant film according to the present embodiment can be used in various uses in which air permeation resistance and flexibility are required. For example, the film is used in various tires of automobiles and two-wheel vehicles (including bicycles), air suspension (air cushion), hoses, and the like. Preferably, the film is used in a pneumatic tire, and a pneumatic tire is cited as an example and described below.

FIG. 1 is a cross-sectional view of a pneumatic tire (1) according to the embodiment. As shown in FIG. 1, the pneumatic tire (1) is constituted of a pair of bead parts (2) to be mounted on a rim, a pair of sidewall parts (3) extending to the outside of a tire radial direction from the bead parts (2), and a tread part (4) provided between a pair of the sidewall parts (3) and grounding to a road surface. A ring-shaped bead core (5) is embedded in a pair of the bead parts (2). A carcass ply (6) using an organic fiber cord is folded back around the bead core (5) and locked, and is provided so as to bridge between the right and left bead parts (2). Furthermore, a belt (7) comprising two crossing belt plies using a rigid tire cord such as a steel cord or an aramide fiber is provided on the outer peripheral side in the treat part (4) of the carcass ply (6).

An inner liner (8) is provided on the inside of the carcass ply (6) over the entire tire inner surface. In the present embodiment, the above-described air permeation resistant film is used as the inner liner (8). As shown in an enlarged view in FIG. 1, the inner liner (8) is bonded to the inner surface of the carcass ply (6) which is a rubber layer on a tire inner surface side, and in more detail, is bonded to the inner surface of a topping rubber layer covering the cord of the carcass ply (6).

A method for producing the pneumatic tire includes a method of preparing a green tire using an air permeation resistant film as an inner liner, and vulcanization molding the green tire in a mold. In more detail, both edges of the air permeation resistant film are thermally welded by heat sealing to prepare a cylindrical inner liner. The inner liner is fitted to a building drum. Subsequently, a rubber layer for adhering an inner liner and a carcass ply to each other, an unvulcanized carcass ply, a bead core having unvulcanized bead filler attached thereto, and an unvulcanized sidewall rubber are sequentially fitted to form a cylindrical carcass band on the building drum. A tread ring previously molded is arranged on the outer peripheral side of the carcass band. The tread ring is molded on other building drum, and is a circular body comprising an unvulcanized belt layer and an unvulcanized treat rubber bonded to the outer peripheral side thereof. After arranging the tread ring, internal pressure is applied to the carcass band to enlarge the carcass band into a toroidal form and to compression bond the carcass band to the inner peripheral side of the tread ring, thereby molding a green tire. The green tire is heated under pressure in a mold to vulcanize the green tire. Thus, a pneumatic tire is obtained.

In the example shown in FIG. 1, the air permeation resistant film was provided on an inner surface side of the carcass ply. However, the air permeation resistant film can be provided in various positions such as an outer surface side of the carcass ply so long as it is the embodiment that can prevent air from permeate from the interior of the tire to hold air pressure of a tire, that is, the air permeation resistant film is provided as an air permeation inhibiting layer for holding internal pressure. Thus, the position of the air permeation resistant film provided is not particularly limited.

EXAMPLES

The present invention is specifically described below on the basis of Examples, but it should not be construed that the present invention is limited to those Examples.

[Measurement Method]

Measurement methods of the following physical properties and evaluations are as follows.

Melting point (Tm): A thermoplastic polyester elastomer dried at 50° C. for 15 hours under reduced pressure was once heated to 250° C., melted and cooled to 50° C. using a differential scanning calorimeter DCS220C (manufactured by Seiko Electrics Industrial Co., Ltd.). The thermoplastic polyester elastomer was again heated in a temperature rising rate of 20° C./min, and subjected to measurement. Peak temperature of absorption of heat by fusion was defined as a melting point. 10 mg of a measurement sample was weighed on an aluminum pan (manufactured by SII Nano Technology Inc., part number SS00E030), and was subjected to measurement in nitrogen atmosphere in a sealed state with an aluminum lid (manufactured by SII Nano Technology Inc., part number SS00E032).

Air permeation coefficient: Air permeation coefficient was measured under the conditions of test gas: air and testing temperature: 80° C. using a gas permeability measuring instrument "BT-3", manufactured by Toyo Seiki Seisaku-Sho, Ltd., according to JIS K7126-1.

Young's modulus: Measured according to JIS K6251 "Tensile test method of vulcanized rubber". A sample was punched out from a film prepared by extrusion molding with JIS #3 dumbbell such that a direction parallel to flow of a resin when extruding is a tensile direction, a stress-strain curve was obtained using Autograph AG-X manufactured by Shimadzu Corporation, and Young's modulus was obtained from inclination of a tangent line to the curve in its initial strain region (elongation range of from 1 to 5%).

Film formability: A film having a width of 350 mm and a thickness of 0.2 mm was formed by T-die molding with an extruder. The case that the film could be formed without formation of holes was evaluated as "◯ (Good)", and the case that holes were generated was evaluated as "X (Poor)".

Tire moldability: A film was wound around a tire building drum, and test was carried out to inflate into a shape of green tire. The test was carried out 5 times. The case that poor moldability such as peeling occurred one time or more was evaluated as "X (Poor)", and the case that poor molding did not occur was evaluated as "◯ (Good)".

Mass of tire: Indicated by an index as mass of the tire of Comparative Example 14 was 100. The tire is lightweight as the index is small.

Tire internal pressure holding performance: A tire (195/65R15) was mounted on a rim (15×6-JJ), and allowed to stand with initial pressure of 240 kPa under no-load condition at room temperature of 24° C. for 3 months. Pressure was measured every 3 days. When measuring pressure is Pt, initial pressure is Po and lapsed day is t, $\alpha$ value is obtained by regressing to the function $Pt/Po=\exp(-\alpha t)$. Using the $\alpha$ obtained and substituting t=30 into $\beta=[1-\exp(-\alpha t)]\times 100$, $\beta$ value is obtained. The $\beta$ value is defined as pressure decreasing rate (%/month) and was indicated by an index setting the value of Comparative Example 14 to be 100. Air leakage is small, and therefore internal pressure holding performance is high, as the index is smaller.

[Materials Used]

(Thermoplastic Elastomer and Thermoplastic Resin)

The details of the thermoplastic elastomers and thermoplastic resins used in Examples and Comparative Examples are shown in Table 1. Air permeation coefficient and Young's modulus in Table 1 are values measured on films that were obtained by T-die molding the thermoplastic elastomers and thermoplastic resins into a film having a width of 350 mm and a thickness of 0.2 mm by a single-screw extruder.

TABLE 1

| | Thermoplastic polyester elastomer | | | | | | | Thermoplastic resin |
|---|---|---|---|---|---|---|---|---|
| | TPEE-1 | TPEE-2 | TPEE-3 | TPEE-4 | TPEE-5 | TPEE-6 | TPEE-7 | Nylon 11 |
| Trade name | PELPRENE C-2000 | Synthesis Example 1 | PELPRENE S-2001 | PELPRENE S-1002 | PELPRENE P-90B | PELPRENE P-70B | PELPRENE EN-2000 | BESN TL |
| Manufacturer | Toyobo Co., Ltd. | | Toyobo Co., Ltd. | Toyobo Co., Ltd. | Toyobo Co., Ltd. | Toyobo Co., Ltd. | Toyobo Co., Ltd. | Arkema Co. |
| Hard segment | | | Polybutylene terephthalate | | | | Polybutylene naphthalate | |
| Soft segment | Aliphatic polycarbonate | | Polycaprolactone | | Poly(tetramethylene oxide) glycol | | | |
| Melting point (° C.) | 207 | 215 | 206 | 200 | 203 | 200 | 224 | 183-190 |
| Air permeation coefficient (×10$^{13}$ fm$^2$/Pa · s) | 2.34 | 0.97 | 3.92 | 6.93 | 6.49 | 9.94 | 3.86 | 0.99 |
| Young's modulus (MPa) | 213 | 460 | 127 | 89 | 115 | 90 | 124 | 503 |

In Table 1, regarding PELPRENE C-2000, the glycol of polycarbonate comprises 1,6-hexanediol. Furthermore, TPEE-2 is synthesized by the following Synthesis Example 1.

Synthesis Example 1

100 parts by mass of aliphatic polycarbonate diol (carbonate diol T6002 manufactured by Asahi Kasei Chemicals Corporation, molecular weight: 2150, 1,6-hexanediol type) and 3.2 parts by mass of diphenyl carbonate were charged, and reacted at a temperature of 205° C. under 130 Pa. Two hours later, the content was cooled and a polymer was taken out. The aliphatic polycarbonate diol obtained had a number average molecular weight of 3,150. 100 parts by mass of polybutylene terephthalate (PBT) having a number average molecular weight of 30,000 and 18 parts by mass of the polycarbonate diol having a number average molecular weight of 3,150 prepared by the above method were stirred at 230-245° C. under 130 Pa for 1 hour, and after confirming that the resin became transparent, the content was taken out and cooled to obtain a thermoplastic polyester elastomer (TPEE-2). The polymer has the proportion of hard segment higher than that of TPEE-1. For this reason, a melting point was high and an air permeation coefficient was low.

(Rubber)

The details of the rubbers used in Examples and Comparative Examples are shown in Table 2. Air permeation coefficient and Young's modulus cannot be measured in raw material rubbers (uncrosslinked state). Therefore, the air permeation coefficient and Young's modulus in Table 2 are values obtained by measuring sheets obtained by preparing a sheet having a thickness of 1 mm for air permeation coefficient test and a sheet having a thickness of 2 mm for Young's modulus measurement, respectively, in the compounding (parts by mass) described in Table 2, followed by crosslinking (160° C.×60 min).

TABLE 2

| | | NBR (NITRILE RUBBER) | H-NBR (HYDROGENATED NITRILE RUBBER) | IIR (BUTYL RUBBER) |
|---|---|---|---|---|
| Trade name | | N230S | ZETPOL 2020 | BUTYL 268 |
| Manufacturer | | JSR CORPORATION | ZEON CORPORATION | JSR CORPORATION |
| Air permeation coefficient (×10$^{13}$ fm$^2$/Pa · s) | | 7.28 | 8.96 | 5.39 |
| Young's modulus (MPa) | | 2 | 3 | 1 |
| Compounding (parts by mass) | Rubber polymer | 100 | 100 | 100 |
| | Carbon black | | | 10 |
| | Zinc white | 5 | 5 | |
| | Stearic acid | 1 | 1 | |
| | Sulfur | 0.3 | 0.3 | |
| | Vulcanization accelerator (NS) | 1 | 1 | |
| | Phenolic resin | | | 5 |

(Other Components)

The details of other components including the compounding ingredients in Table 2 above are as follows.

Sulfur: Powdered Sulfur manufactured by Tsurumi Chemical industry Co., Ltd.

Vulcanization accelerator (NS): NOCCELER NS-P, manufactured by Ouchi Shinko Chemical Industrial Co., Ltd.

Zinc white: Zinc White #3 manufactured by Mitsui Mining & Smelting Co., Ltd.

Phenolic resin: TACKIROL 201T manufactured by Taoka Chemical Co., Ltd. (alkyl phenol-formaldehyde resin)

Carbon black: GPF, SEAST V manufactured by Tokai Carbon Co., Ltd.

Stearic acid: LUNAC S-20 manufactured by Kao Corporation

Compatibilizing agent 1: MODIPPER CL-430, manufactured by NOF Corporation, a graft copolymer having a main chain composed of polycarbonate resin (70 mass %) and a side chain composed of modified acrylonitrile-styrene copolymer resin (30 mass %).

Compatibilizing agent 2: MODIPPER A4100, manufactured by NOF Corporation, a graft copolymer having a main chain composed of ethylene-glycidyl methacrylate and a side chain composed of polystyrene resin.

Compatibilizing agent 3: BOND-FAST E manufactured by Sumitomo Chemical Co., Ltd., ethylene-glycidyl methacrylate copolymer (glycidyl methacrylate content: 12%)

NR: natural rubber, RSS#3

Br-IIR: BROMOBUTYL 2255 manufactured by Exxon Mobil Corporation

Paraffin oil: JOMO PROCESS P200 manufactured by Japan Energy Corporation

Vulcanization accelerator (DM): NOCCELER DM manufactured by Ouchi Shinko Chemical Industrial Co., Ltd.

First Example

According to the formulations (in parts by mass) described in Tables 3 and 4 below, a thermoplastic elastomer (A) and a rubber (B) were compounded, melt-kneaded with a twin-screw kneading machine (manufactured by Research Laboratory of Plastic Technology Co., Ltd.), dynamically crosslinked and pelletized. In this case, regarding the formulation in which sulfur and a vulcanization accelerator were used as a crosslinking agent, the crosslinking agent was added during mixing with a twin-screw extruder, and regarding the formulation using a phenolic resin, the mixture having a crosslinking agent previously added to the rubber (B) was introduced in a twin-screw extruder. The pellets obtained were extruded on a roll (preset temperature: 60° C.) from T-die by a single screw extruder to obtain a film having a width of 350 mm and a thickness of 0.2 mm.

Air permeability and Young's modulus of the film obtained were measured, and film formability was evaluated. The results are shown in Tables 3 and 4. Regarding each film of the Examples, phase image was confirmed by SPM (scanning probe microscope). As a result, it was an islands-sea structure having a continuous phase composed of a thermoplastic elastomer and a dispersed phase composed of a rubber. Particularly, in Examples 8 to 10, a size of the dispersed phase was fine, and good islands-sea structure was formed.

As shown in Tables 3 and 4, in Comparative Example 13 in which the continuous phase is composed of the thermoplastic resin and the dispersed phase is composed of the rubber, air permeation resistance is excellent, but Young's modulus is high, and flexibility was poor. On the other hand, in Examples 1 to 15, by constituting the continuous phase with the thermoplastic elastomer having a specific air permeation coefficient and combining the thermoplastic elastomer with the rubber constituting the dispersed phase, flexibility could be imparted without increasing the proportion of the rubber. As a result, both flexibility and air permeation resistance could be achieved, and film formability was maintained good.

Furthermore, among thermoplastic elastomers, when a thermoplastic elastomer having a soft segment composed of aliphatic polycarbonate was used, more excellent characteristics were shown in the balance between air permeation resistance and flexibility. For example, as is apparent from the comparison between Example 12 in which the soft segment is aliphatic polycarbonate and Example 14 in which the soft segment is aliphatic polyester or Example 15 in which the soft segment is polyether, Example 12 shows Young's modulus equivalent to those of Examples 14 and 15, but air permeation resistance is remarkably excellent. Thus, the balance between air permeation resistance and flexibility was excellent.

In the comparison between Comparative Example 4 and Example 2, apparently uniform film was formed in Example 2 as compared with Comparative Example 4 by the addition of a compatibilizing agent, and thus film formability was excellent. Similarly, in the comparison between Example 4 and Example 6, film formability was excellent in Example 6 as compared with Example 4 by the addition of a compatibilizing agent.

TABLE 3

| | | Comparative Example 1 | Comparative Example 2 | Comparative Example 3 | Example 1 | Comparative Example 4 | Example 2 | Comparative Example 5 |
|---|---|---|---|---|---|---|---|---|
| Formulation (parts by mass) | TPEE-1 | 50 | 40 | 50 | 60 | 50 | 50 | 30 |
| | TPEE-2 | | | | | | | |
| | TPEE-3 | | | | | | | |
| | TPEE-4 | | | | | | | |
| | TPEE-5 | | | | | | | |
| | TPEE-6 | | | | | | | |
| | TPEE-7 | | | | | | | |
| | Nylon 11 | | | | | | | |
| | NBR | 50 | 60 | 50 | 40 | | | |
| | H-NBR | | | | | 50 | 50 | |
| | IIR | | | | | | | 70 |
| Crosslinking agent | Sulfur | 0.15 | | | | 0.15 | 0.15 | |
| | Vulcanization accelerator (NS) | 0.5 | | | | 0.5 | 0.5 | |
| | Phenolic resin | | 3 | 2.5 | 2 | | | 3.5 |
| | Compatibilizing agent 1 | | 4 | 5 | 6 | | 5 | |
| | Compatibilizing agent 2 | | | | | | | |
| | Compatibilizing agent 3 | | | | | | | |
| | Carbon black | | | | | | | |
| Air permeation coefficient ($\times 10^{13}$ fm$^2$/Pa·s) | | 6.30 | 6.76 | 6.04 | 4.48 | 5.63 | 4.78 | Impossible to measure |
| Young's modulus (MPa) | | 44 | 31 | 49 | 70 | 56 | 73 | Impossible to measure |
| Film formability | | ◯ | ◯ | ◯ | ◯ | ◯ | ◯ | X |

| | | Example 3 | Example 4 | Example 5 | Example 6 | Example 7 | Example 8 | Example 9 | Example 10 |
|---|---|---|---|---|---|---|---|---|---|
| Formulation (parts by mass) | TPEE-1 | 40 | 50 | 50 | 50 | 60 | 50 | 60 | 70 |
| | TPEE-2 | | | | | | | | |
| | TPEE-3 | | | | | | | | |
| | TPEE-4 | | | | | | | | |
| | TPEE-5 | | | | | | | | |

TABLE 3-continued

|  |  |  |  |  |  |  |  |  |
|---|---|---|---|---|---|---|---|---|
| TPEE-6 |  |  |  |  |  |  |  |  |
| TPEE-7 |  |  |  |  |  |  |  |  |
| Nylon 11 |  |  |  |  |  |  |  |  |
| NBR |  |  |  |  |  |  |  |  |
| H-NBR |  |  |  |  |  |  |  |  |
| IIR | 60 | 50 | 50 | 50 | 40 | 50 | 40 | 30 |
| Crosslinking agent — Sulfur |  |  |  |  |  |  |  |  |
| Vulcanization accelerator (NS) |  |  |  |  |  |  |  |  |
| Phenolic resin | 3 | 2.5 | 2.5 | 2.5 | 2 | 2.5 | 2 | 1.5 |
| Compatibilizing agent 1 |  |  |  |  |  |  |  |  |
| Compatibilizing agent 2 |  |  |  | 5 |  |  |  |  |
| Compatibilizing agent 3 |  |  |  |  |  | 5 | 6 | 7 |
| Carbon black |  |  | 5 |  |  |  |  |  |
| Air permeation coefficient ($\times 10^{13}$ fm$^2$/Pa · s) | 4.80 | 4.29 | 4.29 | 4.54 | 3.51 | 4.97 | 4.58 | 4.25 |
| Young's modulus (MPa) | 18 | 46 | 46 | 57 | 71 | 39 | 55 | 72 |
| Film formability | ○ | ○ | ○ | ○ | ○ | ○ | ○ | ○ |

TABLE 4

|  |  | Example 11 | Example 12 | Example 13 | Comparative Example 6 | Comparative Example 7 | Comparative Example 8 | Comparative Example 9 |
|---|---|---|---|---|---|---|---|---|
| Formulation (parts by mass) | TPEE-1 | 30 |  |  |  |  | 80 |  |
|  | TPEE-2 | 30 | 50 | 55 | 60 | 70 |  | 80 |
|  | TPEE-3 |  |  |  |  |  |  |  |
|  | TPEE-4 |  |  |  |  |  |  |  |
|  | TPEE-5 |  |  |  |  |  |  |  |
|  | TPEE-6 |  |  |  |  |  |  |  |
|  | TPEE-7 |  |  |  |  |  |  |  |
|  | Nylon 11 |  |  |  |  |  |  |  |
|  | NBR |  |  |  |  |  |  |  |
|  | H-NBR |  |  |  |  |  |  |  |
|  | IIR | 40 | 50 | 45 | 40 | 30 | 20 | 20 |
| Crosslinking agent | Sulfur |  |  |  |  |  |  |  |
|  | Vulcanization accelerator (NS) |  |  |  |  |  |  |  |
|  | Phenolic resin | 2 | 2.5 | 2.25 | 2 | 1.5 | 1 | 1 |
|  | Compatibilizing agent 1 |  |  |  |  |  |  |  |
|  | Compatibilizing agent 2 |  |  |  |  |  |  |  |
|  | Compatibilizing agent 3 | 6 | 5 | 5.5 | 6 | 7 |  |  |
|  | Carbon black |  |  |  |  |  |  |  |
| Air permeation coefficient ($\times 10^{13}$ fm$^2$/Pa · s) |  | 3.22 | 2.85 | 2.60 | 2.40 | 2.08 | 2.57 | 1.58 |
| Young's modulus (MPa) |  | 102 | 91 | 111 | 135 | 222 | 141 | 285 |
| Film formability |  | ○ | ○ | ○ | ○ | ○ | ○ | ○ |

|  |  | Example 14 | Comparative Example 10 | Comparative Example 11 | Comparative Example 12 | Example 15 | Comparative Example 13 |
|---|---|---|---|---|---|---|---|
| Formulation (parts by mass) | TPEE-1 |  |  |  |  |  |  |
|  | TPEE-2 |  |  |  |  |  |  |
|  | TPEE-3 | 80 |  |  |  |  |  |
|  | TPEE-4 |  | 80 |  |  |  |  |
|  | TPEE-5 |  |  | 80 |  |  |  |
|  | TPEE-6 |  |  |  | 80 |  |  |
|  | TPEE-7 |  |  |  |  | 80 |  |
|  | Nylon 11 |  |  |  |  |  | 50 |
|  | NBR |  |  |  |  |  | 50 |
|  | H-NBR |  |  |  |  |  |  |
|  | IIR | 20 | 20 | 20 | 20 | 20 |  |
| Crosslinking agent | Sulfur |  |  |  |  |  | 0.15 |
|  | Vulcanization accelerator (NS) |  |  |  |  |  | 0.5 |
|  | Phenolic resin | 1 | 1 | 1 | 1 | 1 |  |
|  | Compatibilizing agent 1 |  |  |  |  |  |  |
|  | Compatibilizing agent 2 |  |  |  |  |  |  |
|  | Compatibilizing agent 3 |  |  |  |  |  |  |
|  | Carbon black |  |  |  |  |  |  |
| Air permeation coefficient ($\times 10^{13}$ fm$^2$/Pa · s) |  | 4.83 | 6.73 | 6.90 | 8.75 | 4.93 | 2.08 |
| Young's modulus (MPa) |  | 85 | 58 | 70 | 51 | 95 | 163 |
| Film formability |  | ○ | ○ | ○ | ○ | ○ | ○ |

Second Example

Pneumatic tires were produced using the films of Examples 8 and 11 to 13 and Comparative Examples 3, 6 and 8 and also the conventional rubber sheet prepared by the formulation of Comparative Example 14 shown in Table 5 below as inner liners, respectively. Thicknesses of the films and rubber sheet are shown in Table 5. The films were prepared by extrusion molding each pellet on a roll (preset temperature: 60° C.) in a width of 500 mm from T-die by a single screw extruder.

In producing a tire, the above film or rubber sheet was wound around a tire building drum to prepare a carcass band, and tire moldability was evaluated by enlarging a diameter of the carcass band to compression-bond it to an inner peripheral side of a tread ring, thereby producing a green tire, according to an ordinary method. To secure adhesiveness between the film or sheet and a carcass ply, a rubber adhesive layer was adhered onto the film or sheet, and the carcass ply was adhered thereon. Thus, a green tire was formed. The rubber adhesive layer having a thickness of 0.3 mm was used for the film, and the rubber adhesive layer having a thickness of 0.5 mm was used for the rubber sheet. Regarding the film, its edges were bonded by heat sealing to prepare a cylinder, and the cylinder was mounted on the tire building drum.

Subsequently, the green tire was vulcanized at 180° C. for 15 minutes by a vulcanizer to obtain a tire having a tire size of 195/65R15. Internal pressure holding performance of the tire obtained was evaluated. The results are shown in Table 5.

As shown in Table 5, in the use of the films of Comparative Examples 6 and 8 having Young's modulus exceeding 120 MPa, tire moldability was poor. On the other hand, in the use of the films of Examples 8 and 11 to 13, tire moldability is excellent, and additionally, internal pressure holding effect of a tire could be developed by excellent air permeation resistance while attempting to reduce a weight by thinning an inner liner. In Comparative Example 3, air permeation coefficient of the film was high. As a result, the internal pressure holding performance of a tire was inferior to that of Examples 11 to 13 in which a thickness of a film is small, as well as that of Example 8 in which the film has the same thickness as Comparative Example 3.

INDUSTRIAL APPLICABILITY

The present invention can be utilized in various products in which air permeation resistance is required, and particularly, can be preferably used in various pneumatic tires of automobiles (passenger cars, trucks, buses and the like) and two-wheel vehicles.

REFERENCE SIGNS LIST

1: Pneumatic tire
6: Carcass ply
8: Inner liner

The invention claimed is:

1. An air permeation resistant film consisting essentially of:
 (A) a thermoplastic polyester elastomer which is a block copolymer containing a hard segment and a soft segment, and has a melting point of from 180 to 230° C., and (B) at least one rubber, in a mass ratio (A)/(B) of from 90/10 to 40/60,
 wherein the component (A) and the component (B) are melt-kneaded to perform dynamic crosslink, thereby forming a continuous phase composed of the component (A) and a dispersed phase composed of the component (B),
 wherein the hard segment comprises polybutylene terephthalate,
 wherein the soft segment comprises aliphatic polycarbonate,
 the film has an air permeation coefficient at 80° C. of $5 \times 10^{13}$ fm$^2$/Pa·s or less and Young's modulus of 120 MPa or less,
 wherein a number average molecular weight of aliphatic polycarbonate diol, which is a raw material of the aliphatic polycarbonate, is from 3,000 to 60,000.

2. The air permeation resistant film according to claim 1, wherein the component (B) is at least one rubber selected from butyl rubber, halogenated butyl rubber, nitrile rubber and hydrogenated nitrile rubber.

TABLE 5

|  |  | Comparative Example 3 | Example 8 | Example 11 | Example 12 | Example 13 | Comparative Example 6 | Comparative Example 8 | Comparative Example 14 |
|---|---|---|---|---|---|---|---|---|---|
| Formulation (part by mass) | TPEE-1 | 50 | 50 | 30 |  |  |  | 80 |  |
|  | TPEE-2 |  |  | 30 | 50 | 55 | 60 |  |  |
|  | IIR |  | 50 | 40 | 50 | 45 | 40 | 20 |  |
|  | NBR | 50 |  |  |  |  |  |  |  |
|  | NR |  |  |  |  |  |  |  | 40 |
|  | Br-IIR |  |  |  |  |  |  |  | 60 |
| Crosslinking agent | Sulfur |  |  |  |  |  |  |  | 0.5 |
|  | Vulcanization accelerator (DM) |  |  |  |  |  |  |  | 2 |
|  | Phenolic resin | 2.5 | 2.5 | 2 | 2.5 | 2.25 | 2 | 1 |  |
|  | Compatibilizing agent 1 | 5 |  |  |  |  |  |  |  |
|  | Compatibilizing agent 3 |  | 5 | 6 | 5 | 5.5 | 6 |  |  |
|  | Paraffin oil |  |  |  |  |  |  |  | 5 |
|  | Zinc white |  |  |  |  |  |  |  | 3 |
|  | Stearic acid |  |  |  |  |  |  |  | 1 |
|  | Carbon black |  |  |  |  |  |  |  | 50 |
| Film thickness (mm) |  | 0.3 | 0.3 | 0.2 | 0.2 | 0.2 | 0.2 | 0.2 | 0.6 |
| Young's modulus of film (MPa) |  | 49 | 39 | 102 | 91 | 111 | 135 | 141 | 3 |
| Tire moldability |  | ○ | ○ | ○ | ○ | ○ | X | X | ○ |
| Mass of tire (index) |  | 95 | 95 | 94 | 94 | 94 | — | — | 100 |
| Internal pressure holding performance of tire (index) |  | 107 | 76 | 85 | 75 | 68 | — | — | 100 |

3. The air permeation resistant film according to claim 1, wherein the component (A) has an air permeation coefficient at 80° C. of $5\times10^{13}$ fm$^2$/Pa·s or less and Young's modulus of from 100 to 500 MPa, and the component (B) has Young's modulus of 50 MPa or less.

4. The air permeation resistant film according to claim 1, which further contains a compatibilizing agent.

5. The air permeation resistant film according to claim 4, wherein the compatibilizing agent has an ethylene main chain framework and a side chain containing an epoxy group.

6. The air permeation resistant film according to claim 1, further contains a crosslinking agent for dynamically crosslinking the at least one rubber of component (B), wherein the crosslinking agent is a phenolic resin.

7. The air permeation resistant film according to claim 1, wherein a mass ratio of the hard segment to the soft segment is from 45/55 to 87/13.

8. The air permeation resistant film according to claim 1, wherein the mass ratio (A)/(B) is from 90/10 to 50/50.

9. The air permeation resistant film according to claim 1, wherein the hard segment is polybutylene terephthalate, and the soft segment is aliphatic polycarbonate.

10. The air permeation resistant film according to claim 1, wherein the aliphatic polycarbonate diol is produced from carbonate ester and aliphatic glycol having from 2 to 12 carbon atoms.

11. A pneumatic tire having the air permeation resistant film according to claim 1 as an inner liner or other air permeation inhibiting layer.

12. A method for producing an air permeation resistant film, which comprises melt-kneading a composition consisting essentially of (A) a thermoplastic polyester elastomer that is a block copolymer containing a hard segment and a soft segment, and has a melting point of from 180 to 230° C., and (B) at least one a rubber, in a mass ratio (A)/(B) of from 90/10 to 40/60 to perform dynamic crosslink, thereby obtaining a polymer composition comprising a continuous phase composed of the component (A) and a dispersed phase composed of the component (B), and forming a film comprising the polymer composition,
wherein the hard segment comprises polybutylene terephthalate,
wherein the soft segment comprises aliphatic polycarbonate, and
wherein a number average molecular weight of aliphatic polycarbonate diol, which is a raw material of the aliphatic polycarbonate, is from 3,000 to 60,000.

13. The production method according to claim 12, wherein the air permeation resistant film has an air permeation coefficient at 80° C. of $5\times10^{13}$ fm$^2$/Pa·s or less and Young's modulus of 120 MPa or less.

14. The production method according to claim 12, wherein the component (A) has an air permeation coefficient at 80° C. of $5\times10^{13}$ fm$^2$/Pa·s or less and Young's modulus of from 100 to 500 MPa, and the component (B) has Young's modulus of 50 MPa or less.

15. The production method according to claim 12, which comprises mixing a compatibilizing agent together with the component (A) and the component (B).

16. The production method according to claim 15, wherein the compatibilizing agent has an ethylene main chain framework and a side chain containing an epoxy group.

17. The production method according to claim 12, comprising adding a crosslinking agent for dynamically crosslinking the rubber of component (B), wherein the crosslinking agent is a phenolic resin.

18. The production method according to claim 12, wherein the mass ratio (A)/(B) is from 90/10 to 50/50.

19. The production method according to claim 12, wherein the hard segment is polybutylene terephthalate, and the soft segment is aliphatic polycarbonate.

20. The production method according to claim 12, wherein the aliphatic polycarbonate diol is produced from carbonate ester and aliphatic glycol having from 2 to 12 carbon atoms.

21. The production method according to claim 12, wherein the component (B) is at least one rubber selected from butyl rubber, halogenated butyl rubber, nitrile rubber and hydrogenated nitrile rubber.

22. A method for producing a pneumatic tire, which comprises obtaining an air permeation resistant film by the production method according to claim 12, preparing a cylindrical inner liner comprising the air permeation resistant film, fixing a carcass ply and other rubber members including a tread rubber to an outer peripheral side of the inner liner to prepare a green tire, and vulcanization molding the green tire in a mold.

* * * * *